(12) United States Patent  (10) Patent No.: US 10,669,158 B2
Gounder et al.  (45) Date of Patent: Jun. 2, 2020

(54) METHODS OF SYNTHESIZING CHABAZITE ZEOLITES WITH CONTROLLED ALUMINUM DISTRIBUTION AND STRUCTURES MADE THEREFROM

(71) Applicant: Purdue Research Foundation, West Lafayette, IN (US)

(72) Inventors: Rajamani P. Gounder, Lafayette, IN (US); John Rocco Di Iorio, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 15/297,707

(22) Filed: Oct. 19, 2016

(65) Prior Publication Data

US 2017/0107114 A1  Apr. 20, 2017

Related U.S. Application Data

(60) Provisional application No. 62/244,068, filed on Oct. 20, 2015.

(51) Int. Cl.
*C01B 39/48* (2006.01)
*B01J 29/70* (2006.01)

(52) U.S. Cl.
CPC ........... *C01B 39/48* (2013.01); *B01J 29/7015* (2013.01)

(58) Field of Classification Search
CPC ... C01B 39/48; B01J 29/7015; B01J 29/7065; B01J 29/723
See application file for complete search history.

(56) References Cited

U.S. PATENT DOCUMENTS 4,544,538 A * 10/1985 Zones .................. B01J 29/70
423/706
6,709,644 B2 * 3/2004 Zones ................ B01D 67/0051
423/213.2

OTHER PUBLICATIONS

Hobson, ed., Verified Synthesis, second revised edition, (2001) Elsevier (Year: 2001).*

* cited by examiner

*Primary Examiner* — David M Brunsman
(74) *Attorney, Agent, or Firm* — Purdue Research Foundation

(57) ABSTRACT

A method of synthesizing chabazite zeolites with controlled aluminum distribution. The method utilizes a source of an organic structure-directing agent, a source of an inorganic structure-directing agent, a source of aluminum and a source of silicon to form a synthesis gel which is subjected to a crystallization process to crystallize a chabazite zeolite with controlled aluminum distribution. A chabazite zeolite structure with controlled aluminum distribution. The structure contains zeolite crystal lattice framework containing silicon, aluminum, and oxygen; and extra-framework positions containing non-divalent chemical species such that each aluminum atom in the zeolite crystal lattice framework is in an isolated configuration. Another variant of this structure wherein a fraction of the aluminum atoms in the zeolite crystal lattice framework positions are not in an isolated configuration and hence oxygen atoms associated with aluminum atoms in the fraction can bind with the non-aluminum cations in the extra-framework positions.

11 Claims, 7 Drawing Sheets

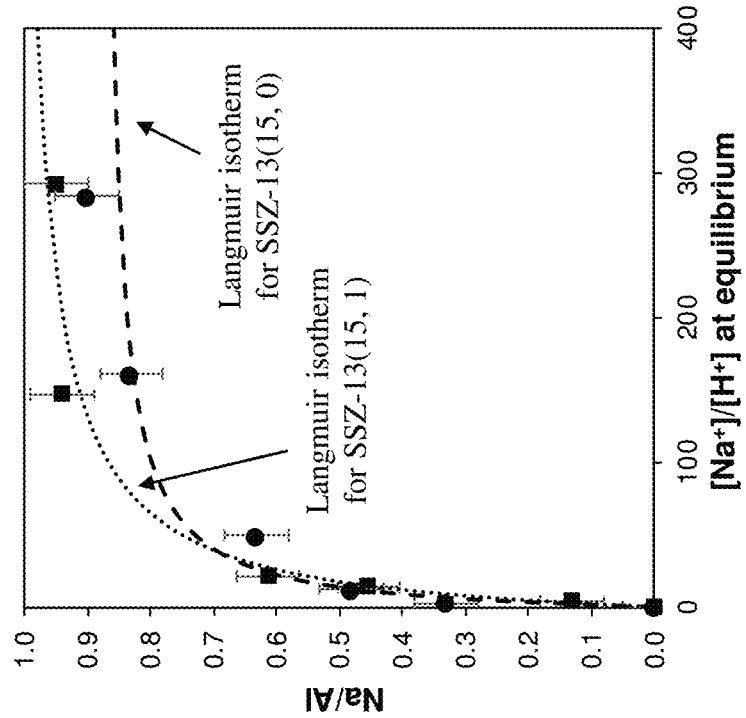
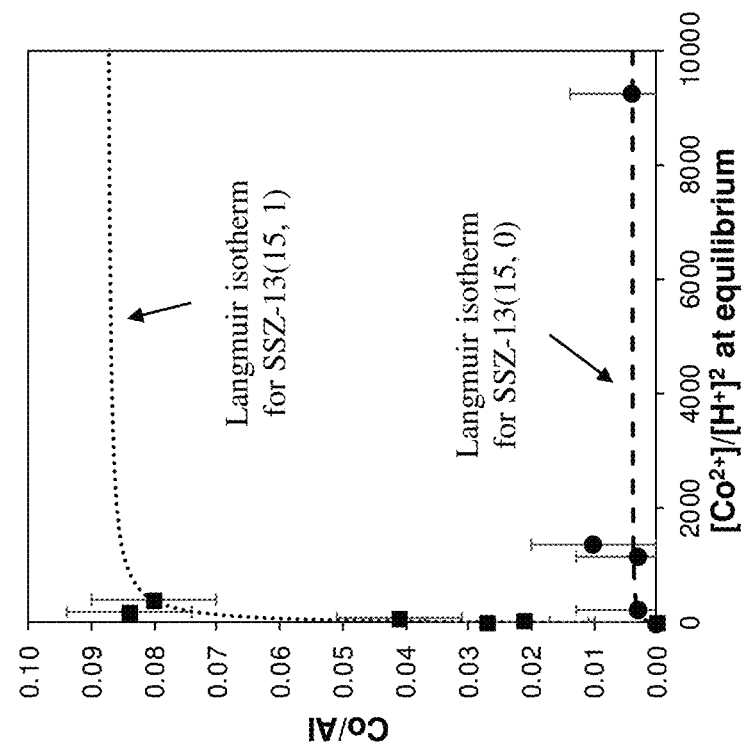
FIG. 1B
FIG. 1A

METHODS OF SYNTHESIZING CHABAZITE ZEOLITES WITH CONTROLLED ALUMINUM DISTRIBUTION AND STRUCTURES MADE THEREFROM

CROSS-REFERENCE TO RELATED APPLICATIONS

The present U.S. patent application is related to and claims the priority benefit of U.S. Provisional Patent Application Ser. No. 62/244,068, filed Oct. 20, 2015, the contents of which are hereby incorporated by reference in their entirety into the present disclosure.

STATEMENT REGARDING GOVERNMENT FUNDING

This invention was made with government support under CBET 1258715 awarded by the National Science Foundation. The government has certain rights in the invention.

TECHNICAL FIELD

This disclosure relates to methods to synthesize chabazite zeolites with controlled aluminum distribution.

BACKGROUND

This section introduces aspects that may help facilitate a better understanding of the disclosure. Accordingly, these statements are to be read in this light and are not to be understood as admissions about what is or is not prior art.

Zeolites are a class of crystalline, microporous, silica-based molecular sieves of varying topology (micropore size and interconnectivity). They are pure-silica ($SiO_2$) materials containing some fraction of their Si atoms substituted with Al, which generate ion-exchange sites and catalytic sites. Zeolites are used in adsorption, ion-exchange and catalytic applications, and especially in the chemical and petrochemical industry as acid catalysts. Current synthesis routes only are specified to prepare a specific crystal structure and bulk elemental composition (Si/Al ratio).

Brønsted acidic zeolites are silica-based molecular sieve frameworks that contain a fraction of their Si atoms substituted with Al atoms, which generate anionic charges balanced by protons that differ in intrazeolite location among known crystal topologies and in density with changes in bulk composition (Si/Al ratio). Yet, even a given zeolite at fixed composition contains catalytic diversity conferred by differences in the arrangement and distribution of its framework Al atoms, because reactive intermediates and transition states formed at their attendant Brønsted acid sites are also stabilized by van der Waals interactions with surrounding oxide cavities. One type of Al arrangement describes the location of Al atoms among different pores of a given zeolite, as in the case of ferrierite (FER) zeolites (Si/Al=10-20) that contain higher fractions of Al within 8-membered rings (8-MR) when crystallized with smaller pyrrolidine (~0.46 nm kinetic diameter) organic structure-directing agents (SDAs) than with larger SDAs (e.g., benzylmethyl-pyrrolidinium, hexamethyleneimine), and that catalyze dimethyl ether carbonylation to methyl acetate with higher turnover rates (per total Al; 473 K) because this reaction occurs with high specificity within 8-MR voids that solvate carbonylation transition states more effectively than 10-MR and larger voids. Another type of Al arrangement describes the proximity of Al atoms within the framework, ranging from the limit of Al site isolation (Al—O(—Si—O)$_x$—Al, $x \geq 3$ to higher densities of proximal or "paired" Al atoms (Al—O(—Si—O)$_x$—Al, x=1, 2), which has been recognized, but not controlled predictably during zeolite synthesis. For purposes of this disclosure, is structure-directing agent is a compound that is present during crystallization of the zeolite and helps guide the formation of the desired crystal structure.

The Al distribution in zeolites has been linked to structural stability, deactivation and coking in acid catalysis with hydrocarbons and alcohols, so manipulating this distribution can benefit those technologies. Aluminum distribution in zeolites has also been linked to the numbers and structures of extraframework metal ions (e.g., $Cu^{2+}$, $(CuOH)^+$) that can be exchanged onto the zeolite, and because these ions are catalytic sites in NOx (x=1,2) selective catalytic reduction with ammonia, manipulating this distribution can benefit those technologies.

The problem of how to control Al distribution in zeolites is currently being addressed by changing various zeolite synthesis variables, including the Si source, Al source, Na source, counteranion (OH, Cl, $PO_4$, $NO_3$), the organic and inorganic additives used, etc. These changes have not been systematically made, and have been studied for other zeolite structures including MFI (or ZSM-5), and have not led to systematic changes in the Al distribution.

An International Patent application, No. PCT/CZ2010/000113 by Oleg Bortnovsky et. al, titled "Method of manufacture of zeolites with pentasil structure with controlled distribution of aluminium atoms in the skeleton" (Publication Number WO2011095140 A1), whose contents are incorporated herein by reference in their entirety into this disclosure, a method of manufacture of microporous zeolites with pentasil structure with controlled distribution of aluminium atoms in an aluminosilicate tetrahedrally coordinated skeleton in "Al pairs" in (Al-O—(Si—O)$_{n=1,2}$-Al) sequences localized in a single ring and in different rings in Al-O—(Si—O)$_{n>2}$-Al sequences.

Chabazite (CHA) zeolites do not have a pentasil structure (i.e., composed of 5-membered rings), and belong to a different class of zeolites composed of 6-membered ring building units. While the previously reported methods, which change the relative amounts and ratios of chemical ingredients to synthesize a zeolite, may be applied to chabazite zeolites, it is unclear exactly how these changes would influence the Al distribution. Pentasil zeolites also have more than 1 crystallographically-unique tetrahedral site (T-site) in the lattice, while CHA zeolites only have 1 crystallographically-unique T-site in the lattice. Therefore, since the underlying mechanisms controlling Al distributions in pentasil zeolites are unknown, the specific strategies used to control Al distribution in pentasil zeolites would not apply to CHA zeolites, because they only contain 1 possible lattice T-site location for Al substitution.

Hence, there is unmet need for synthetic procedures that directly and systematically control the Al distribution in chabazite zeolites at a fixed Si/Al ratio, by only manipulating the type and amount of structure-directing agents used. Further, it is desirable to change the amounts and types of organic and inorganic cations used as structure-directing agents, which leads to clear and systematic changes in the Al distribution in CHA (SSZ-13). Meeting these needs will benefit structural stability, deactivation and coking in acid catalysis with hydrocarbons and alcohols, and will benefit the structural stability and catalytic rates of redox catalysis that occurs on metal ions exchanged onto acid zeolites, such as Cu or Fe ions exchanged onto CHA zeolites for NOx selective catalytic reduction (SCR) with ammonia.

SUMMARY

A method of synthesizing chabazite zeolites with controlled aluminum distribution is disclosed. The method includes the steps of adding a source of an organic structure-directing agent and a source of an inorganic structure-directing agent to water to form an aqueous solution and homogenizing the aqueous solution for a first time period. A source of aluminum is then added to the homogenized aqueous solution to form an intermediate agent and the intermediate agent is homogenized for a second time period to form an aluminum-containing intermediate agent. A source of silicon is then added to the aluminum-containing intermediate agent to form an aluminosilicate-containing intermediate agent. The aluminosilicate-containing intermediate agent is then homogenized for a third time period to form a synthesis gel. The synthesis gel is then subjected to a crystallization process to crystallize a chabazite zeolite, resulting in a chabazite zeolite with controlled aluminum distribution.

A chabazite zeolite structure with controlled aluminum distribution is disclosed. The structure contains a zeolite crystal lattice framework containing silicon, aluminum, and oxygen; and extra-framework positions containing chemical species that are not divalent. Further, each aluminum atom in the zeolite crystal lattice framework is in an isolated configuration.

Also disclosed is another chabazite zeolite structure with controlled aluminum distribution. This structure contains a zeolite crystal lattice framework containing silicon, aluminum, and oxygen; and extra-framework positions containing non-aluminum cations. In this structure, a fraction of the aluminum atoms in the zeolite crystal lattice framework positions are not in an isolated configuration and hence oxygen atoms associated with aluminum atoms in the fraction can bind with the non-aluminum cations in the extra-framework positions.

BRIEF DESCRIPTION OF DRAWINGS

Some of the figures shown herein may include dimensions. Further, some of the figures shown herein may have been created from scaled drawings or from photographs that are scalable. It is understood that such dimensions or the relative scaling within a figure are by way of example, and not to be construed as limiting.

FIG. 1A shows ion exchange isotherms for the sample SSZ-13(15, 0) (circles) and the sample SSZ-13(15, 1) (squares) at varying exchange molarities of Co(NO$_3$)$_2$. The dashed line is a Langmuir isotherm for Co$^{2+}$ exchange of SSZ-13(15, 0), and the dotted line is a Langmuir isotherm for Co$^{2+}$ exchange of SSZ-13(15, 1).

FIG. 1B shows ion exchange isotherms for the sample SSZ-13(15, 0) (circles) and the sample SSZ-13(15, 1) (squares) at varying exchange molarities of NaCl. The dashed line is a Langmuir isotherm for Co$^{2+}$ exchange of SSZ-13(15, 0), and the dotted line is a Langmuir isotherm for Co$^{2+}$ exchange of SSZ-13(15, 1).

DETAILED DESCRIPTION

Figure 2:
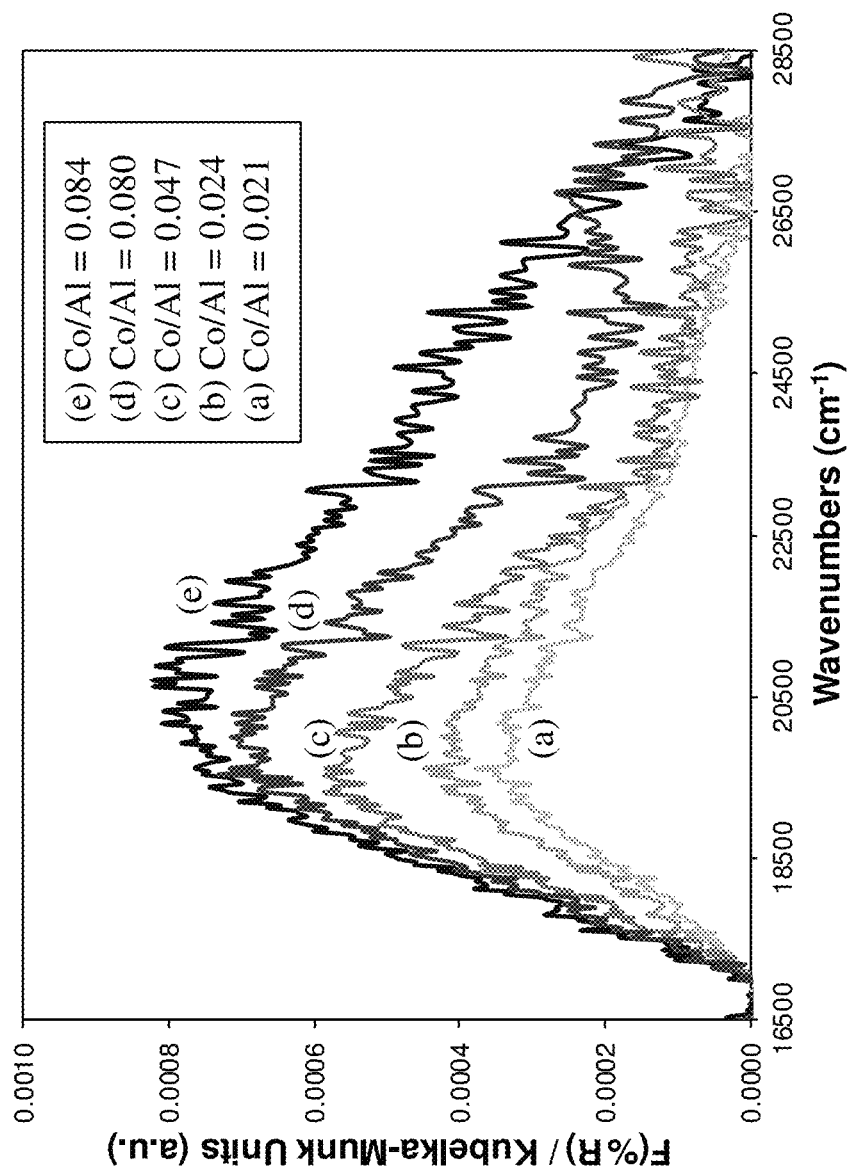
FIG. 2 shows the UV-Visible absorption spectra for the d-d transition of Co$^{2+}$ (centered at ~19,000 cm$^{-1}$) in Co$^{2+}$-exchanged SSZ-13 zeolites with Co/Al values of 0.084 (black trace), 0.08 (dark grey trace), 0.047 (grey trace), 0.024 (light grey), and 0.021 (faint grey trace).

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, such alterations and further modifications in the illustrated device, and such further applications of the principles of the disclosure as illustrated therein being contemplated as would normally occur to one skilled in the art to which the disclosure relates.

In this disclosure, chabazite zeolite structures with controlled aluminum distribution and methods of making them are described. For purposes of this disclosure, a zeolite structure with controlled aluminum distribution is one in which the placement and arrangement (i.e. distribution) of aluminum atoms in its framework is controlled through method of preparation.

Further, certain terms, abbreviations and designations are now defined to help understand this detailed description. CHA stands for Chabazite; SSZ-13 is a trade name familiar to those of ordinary skill in the art and refers to a chabazite structure containing primarily silicon, aluminum, and oxygen, In this disclosure, we focus on the synthesis of CHA zeolites (SSZ-13), which are used commercially as catalysts in their H-form for methanol-to-olefins (MTO) and after Cu— or Fe— exchange for the selective catalytic reduction of mobile-source NO$_x$ pollutants with ammonia. CHA zeolites contain one unique T-site and double 6-membered ring (D6R) building units that interconnect to form 8-MR windows (0.38 nm diameter) that limit transport into larger cages (0.82 nm diameter, 18 T-atoms per cage), and are typically synthesized in the presence of N,N,N-trimethyl-1-adamantylammonium cations (TMAda$^+$) as organic SDAs that become occluded within CHA cages during crystallization. Each zeolite sample is denoted as H-SSZ-13(X,Y) where X is the Si/Al ratio in the solid and Y is the Na$^+$/TMAda$^+$ ratio in the synthesis gel. For purposes of this disclosure, a synthesis gel is a mixture of the aluminum and silicon sources and the structure-directing agents, which is converted to a zeolite when subjected to a crystallization process.

Common approaches to synthesize high-silica SSZ-13 zeolites of varying Si/Al ratio (>10) involve preparing gels with equimolar amounts of Na$^+$ and TMAda$^+$ cations but with varying Al content, as was used here to synthesize H-SSZ-13(15, 1) and H-SSZ-13(25, 1) and to compare with a low-silica H-SSZ-13(4.5) prepared using low-silica FAU zeolites as the Al source. These H-SSZ-13 samples were equilibrated with aqueous $Cu(NO_3)_2$ or $Co(NO_3)_2$ solutions of increasing molarity to obtain partially-metal-exchanged zeolites, with solid Cu/Al or Co/Al ratios measured by atomic absorption spectroscopy and residual $H^+$ content measured by their selective titration with $NH_3$ and subsequent temperature-programmed desorption. Cu exchanged predominantly as $Cu^{2+}$ cations for two $H^+$ sites until Cu/Al ratios of 0.21, 0.09 and 0.05 on H-SSZ-13(4.5), H-SSZ-13(15, 1) and H-SSZ-13(25, 1), respectively, and then as monovalent $[CuOH]^+$ complexes for one fr site. In contrast, Co exchanged exclusively as $Co^{2+}$ cations with Langmuirian adsorption behavior until saturation, as shown in FIG. 1 of this specification. Sole presence of UV-Visible absorption bands for $Co^{2+}$ d-d transitions (19,000 $cm^{-1}$) that increased linearly in area with Co content. FIG. 2 shows the UV-Visible absorption spectra for the d-d transition of $Co^{2+}$ (~19,000 $cm^{-1}$) in Co-exchanged SSZ-13 zeolites with Co/Al exchange values of 0.084 (black trace), 0.08 (dark grey trace), 0.047 (grey trace), 0.024 (light grey), and 0.021 (faint grey trace).

Saturation $Co^{2+}$/Al and $Cu^{2+}$/Al values were identical on all three H-SSZ-13 zeolites, and similar to the fraction of Al pairs in double 6-MR locations of CHA that have been predicted from statistical simulations assuming a random Al distribution subject to Lowenstein's rule. These findings demonstrate that $Co^{2+}$ cations can selectively titrate paired Al in zeolites, and that synthesis gels containing equimolar amounts of $Na^+$ and $TMAda^+$ crystallized SSZ-13 zeolites with a random framework Al distribution at different bulk compositions, which was surprising and unexpected considering the non-random siting of Al atoms reported for CHA and other zeolites.

In experiments leading to this disclosure, SSZ-13 zeolites (Si/Al=15, 25) crystallized from gels comprising equimolar amounts of $Na^+$ and $TMAda^+$ contained a detectable fraction of "paired" Al atoms, defined here in function as two Al atoms separated by either one or two Si atoms in a 6-MR since both atomic configurations stabilize exchanged $Co^{2+}$ and $Cu^{2+}$ cations with similar energetic preferences according to density functional theory. The maximum concentration of Al atoms beyond which incorporation of additional Al causes unavoidable formation of next-nearest-neighbor Al arrangements (Al—O—Si—O—Al) can be calculated from the topological density of zeolite frameworks, and suggest that SSZ-13 zeolites with Si/Al>7 can be prepared (in theory) to contain exclusively isolated Al atoms. It has been demonstrated in the literature that one $TMAda^+$ cation, which contains a large hydrophobic adamantyl moiety (~0.70 nm in diam.) covalently bound to a singly-charged quaternary ammonium center, occupies the void space within one CHA cage. The synthesis of SSZ-13 in the presence of $TMAda^+$ without $Na^+$ has been demonstrated in fluoride media for Si/Al ratios between 20-400. However, no conclusions regarding the Al distribution or site isolation were made. Thus, in this disclosure, it is postulated that SSZ-13 crystallized solely in the presence of $TMAda^+$, based on steric constraints and the minimization of electrostatic repulsion between anionic framework charges introduced by Al atoms, should enable the separation and isolation of one Al atom per CHA cage (Si/Al=17), on average.

In experiments leading to this disclosure, the crystallization of SSZ-13 zeolites, in the absence of alkali cations, was attempted with varying gel Si/Al ratios (10-60) and all other synthesis variables held constant. Precursor gels with Si/Al ratios between 15 and 30 crystallized phase-pure CHA zeolites with solid Si/Al ratios between 14.5-26.1, with undetectable amounts of extra-framework Al. SSZ-13(15, 0), SSZ-13(20, 0), SSZ-13(25, 0), and SSZ-13(30, 0) samples (including 7 independent syntheses of SSZ-13(15, 0)) were measured by $NH_3$ titration to have $H^+$/Al ratios >0.9, yet these samples were unable to exchange detectable amounts of $Co^{2+}$, reflecting the nearly complete incorporation of Al atoms within the framework, but in locations sufficiently isolated from each other so as to be incapable of divalent cation exchange. The $Co^{2+}$ exchange isotherm measured on SSZ-13(15, 1) shows Langmuirian adsorption behavior reaching a saturation value of Co/Al=0.08 with a calculated fraction of paired Al sites from a fit Langmuir isotherm of 0.087, while SSZ-13(15, 0) showed negligible $Co^{2+}$ exchange under identical exchange conditions, as shown in FIG. 1A. However, $Na^+$ exchange isotherms on both SSZ-13(15, 0) and SSZ-13(15, 1) reach similar saturation values of Na/Al=0.90 and 0.95, respectively, as shown in FIG. 1B. $^{29}Si$ MAS NMR obtained on SSZ-13(15, 0) and SSZ-13(15, 1) look nearly identical and indicate high occupancies of Si(0Al), Si(1Al), and Si—OH groups, but not of Si(2Al) groups, suggesting that Al—O—Si—O—Al linkages are preferentially avoided in favor of Al—$(O-Si)_2$—O—Al groups, as has been observed in FAU zeolites. However, even these Al—$(O-Si)_2$—O—Al linkages are not formed when only $TMAda^+$ is used to synthesize SSZ-13. SSZ-13 zeolite gels with Si/Al<15 formed amorphous phases when only $TMAda^+$ cations were present, yet formed phase-pure SSZ-13 (Si/Al=9) when additional amounts of $Na^+$ cations were added, suggesting that such high concentrations of $AlO_4^-$ tetrahedra led to anionic gel charge densities higher than $TMAda^+$ cations alone were capable of stabilizing, consistent with charge density mismatch theory. Additionally, attempts to crystallize SSZ-13 zeolites with Si/Al>30 in hydroxide media with only $TMAda^+$ also resulted in amorphous phases, presumably because crystallization was frustrated by the requirement to form anionic framework vacancy defects to balance excess cationic charges in occluded $TMAda^+$ cations (those not balanced by framework Al), in light of the ability of SSZ-13 to crystallize with low Al densities (Si/Al=60 to ∞) in the presence of fluoride anions.

Figure 3:
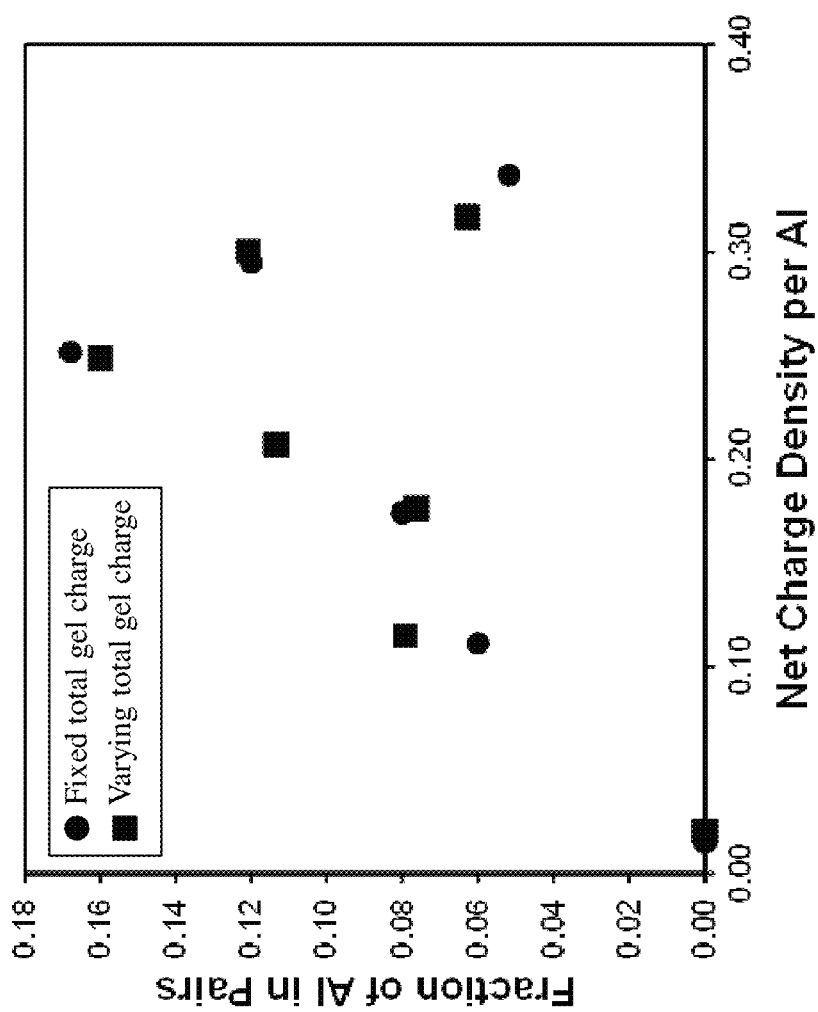
FIG. 3 shows the fraction of paired Al atoms (measured by titration with Co$^{2+}$) as a function of the synthesis gel charge density on SSZ-13(15) samples synthesized by fixing the total gel charge (circles) and by letting the total gel charge vary (squares).

In the experiments of this disclosure, in the synthesis of SSZ-13(15, 0) and SSZ-13(15, 1) the charge density of the synthesis gel, which is defined here as the cationic charge density, has been manipulated by changing the ratio of two equally charged cations having different molecular (or atomic) volumes, i.e. $Na^+$/$TMAda^+$ ratio, while maintaining a constant total gel charge, $(Na^+ + TMAda^+)$/Al, constant Si/Al ratio, and constant gel pH. It has been reported in literature that modification of the $Na^+$ cation concentration in the synthesis of ZSM-5 zeolites led to changes in the number of paired Al atoms, as measured by saturation with ion-exchanged $Co^{2+}$ cations, but different anionic species ($OH^-$, $Cl^-$, $NO_3^-$) and sources of Si and Al precursors were not controlled for, which also influence the Al distribution. In this disclosure, an important aspect is to systematically vary the ratio of $Na^+$/$TMAda^+$ (i.e., charge density) between 0-3 at a fixed composition (Si/Al=15), total synthesis gel charge $((Na^+ + TMAda^+)$/Al=7.5) and pH ($OH^-$/Al=7.5). On all samples synthesized at a constant gel charge density and a gel Si/Al ratio of 15, the final solids product Si/Al molar ratio was constant at a Si/Al=14.5. The number of $TMAda^+$ molecules per CHA cage was measured by thermogravimetric analysis (TGA), and the amount of $Na^+$ remaining on the as-synthesized SSZ-13 product was measured by atomic absorption spectroscopy (AAS). The total $(TMAda^+ + Na^+)$/Al ratio on the zeolite products was near unity on every sample, indicating that every Al atom is charge balanced by either a TMAda$^+$ or a Na$^+$ cation. FIG. 3 of this disclosure shows the Co/Al ratio at saturation Co$^{2+}$ exchange levels, as a function of the synthesis gel cationic charge density.

Figure 4:
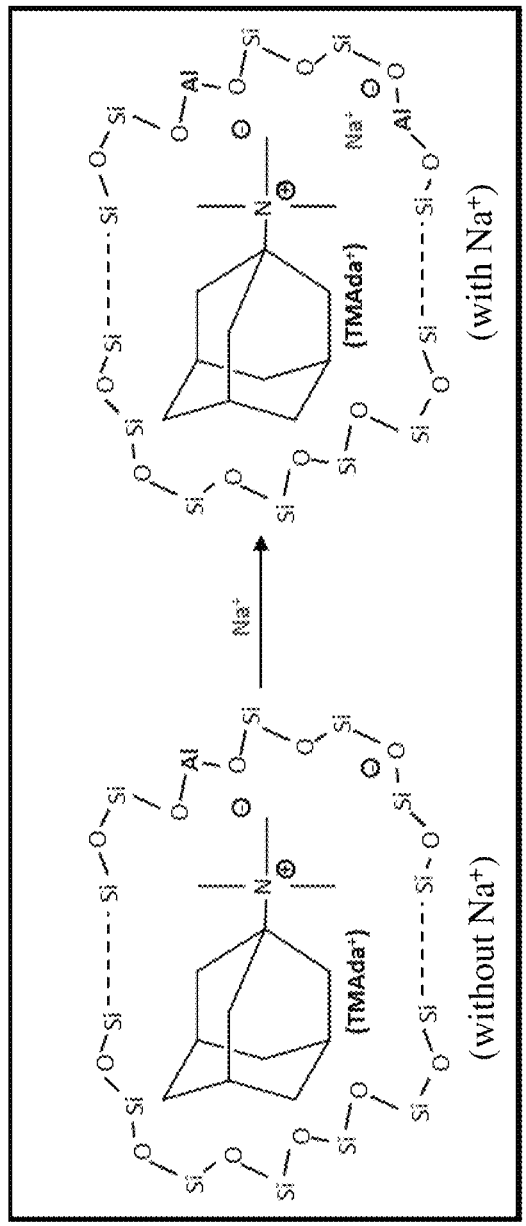
FIG. 4 shows the ordering of Si and Al atoms around the organic structure-directing agent N,N,N-trimethyl-1-adamantylammonium (TMAda$^+$), with and without Na$^+$ present.
Figure 5:
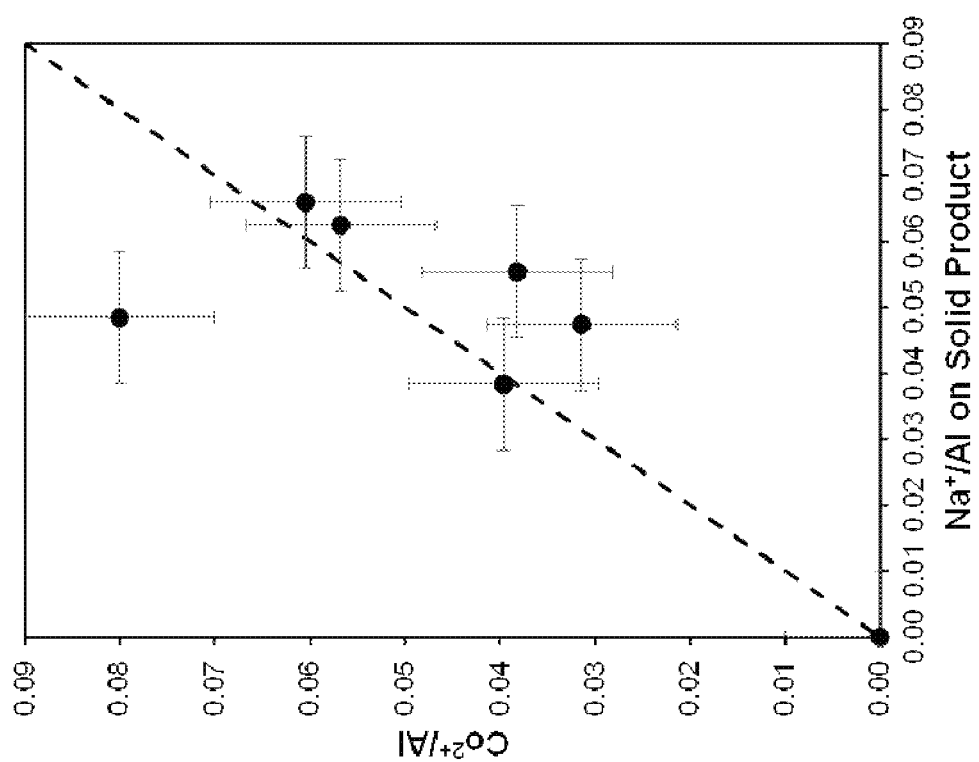
FIG. 5 is a plot of the Co$^{2+}$/Al ratio at saturation Co$^{2+}$ exchange levels, versus the Na$^+$/Al ratio in the crystallized chabazite product.

As the charge density in the gel increases (increasing Na$^+$/TMAda$^+$), the number of paired Al sites also increased to a maximum at Na$^+$/TMAda$^+$=1. Beyond this ratio, the number of paired Al sites begins to decrease towards zero, at which point a phase transition occurs from the CHA framework to the MOR framework between Na$^+$/TMAda$^+$ =2.0 and 2.5. One possible explanation of this phenomenon is that the TMAda$^+$ cation can position isolated Al in the framework, because its cationic charge is localized at one end of the molecule and the bulky organic adamantyl group prevents multiple TMAda$^+$ from occupying the same void space. Na$^+$ cations, which have a large charge density, are capable of being occluded within the D6R and occupying space near the cationic end of the TMAda$^+$ molecule, their addition to the synthesis gel may position neighboring framework Al atoms while minimizing the overall electrostatic repulsion of the zeolite as shown in FIG. 4. As the concentration of Na$^+$ increases towards a Na$^+$/TMAda$^+$=1, the distribution of Al in the framework becomes more random as the increasing number of Na$^+$ atoms are arranged throughout the zeolite structure. FIG. 5 is a plot of the Co$^{2+}$/Al ratio at saturation Co$^{2+}$ exchange levels, versus the Na$^+$/Al ratio in the crystallized chabazite product. Referring to FIG. 5, it can be seen that the Na$^+$ retained on the final SSZ-13 products depends linearly with the amount of Co$^{2+}$ exchanged, suggesting that in the regime bounded by Na$^+$/TMAda$^+$=0 and 1, every additional Na$^+$ atom found on the SSZ-13 product is responsible for forming an Al pair. As the Na$^+$/TMAda$^+$ ratio increases further, the charge density reaches a critical point (Na$^+$/TMAda$^+$=1) at which the Al begins to become more isolated, which in this disclosure is proposed to be due to competition for Na$^+$ with a separate phase forming in the synthesis gel containing Na and Al. As the concentration of Na$^+$ further increases, it becomes increasingly favorable for Na$^+$ to be incorporated into this second phase until the charge density of the synthesis gel eventually reaches a critical point where the CHA framework is no longer capable of outcompeting the second phase, during which a phase change occurs to form the MOR phase.

Additionally, a second set of syntheses in which the total charge of the synthesis gel (i.e. (Na$^+$+TMAda$^+$)/Al) was allowed to vary, in order to examine the influence of the total cationic charge on the Al isolation. The SSZ-13 solids crystallized from a gel Si/Al=15, in which the total cationic charge was allowed to vary, contain solid Si/Al ratios that systematically decreased with increasing total charge. This behavior contrasts the SSZ-13 samples of constant Si/Al ratio=15, prepared with synthesis gels containing fixed cationic charge. The fraction of paired Al, as measured by Co$^{2+}$, showed a similar trend to the SSZ-13 samples synthesized at a constant total gel charge (FIG. 3) indicating that Al isolation is controlled by the cationic charge density of the synthesis gel, and not by the total cationic charge in the gel. A similar series of SSZ-13 syntheses was also repeated for a Si/Al=25 and trends similar to those shown by SSZ(15) are observed suggesting that the dependence of Al distribution (isolated vs. paired) on synthesis gel charge density occurs for other Si/Al ratios.

In experiments leading to this disclosure, zeolites synthesized from different sources of aluminum were found to contain a fraction of aluminum atoms in an isolated configuration. The fraction varied between 0.5 to 1.0 in the samples studied. For purposes of this disclosure, an isolated configuration is a configuration in which each aluminum atom in the zeolite framework is separated from its next nearest aluminum atom neighbor in the framework, such that these two aluminum atoms are not able to behave as an exchange site for an extra framework divalent cation.

Isolated Al atoms among different tetrahedral sites (T-sites) and zeolite topologies in periodic density functional theory models generate protons of equivalent ensemble-averaged deprotonation energy (DPE), a rigorous and probe-independent measure of Brønsted acid strength that influences reactivity in acid catalysis, while paired Al atoms generate weaker protons with higher DPE values (by 11-108 kJ mol$^{-1}$) according to quantum chemical calculations on embedded cluster models. Steam dealumination of faujasite zeolites (FAU; up to 1198 K for 2.5 h under steam) results in the formation of "ultra-stable" FAU that are increasingly resistant to further steam dealumination and $^{29}$Si magic angle spinning nuclear magnetic resonance (MAS NMR) show the preferential removal of Al atoms in paired configurations, leading to FAU zeolites that contain solely isolated Al atoms. Increasing the fraction of isolated Al atoms in H-SSZ-13 zeolites, as monitored by $^{29}$Si MAS NMR, caused by changing the Si/Al ratio (2.3-67) led to increasingly stable conversions as a function of time on stream for the MTO reaction (6.1 v % CH$_3$OH, 548-598 K). Additionally, the arrangement of framework Al atoms controls the specification of extra framework cations that behave as catalytic active sites, as in the case of monovalent [CuOH]$^+$ complexes exchanged at isolated Al and divalent Cu$^{2+}$ cations exchanged at paired Al in chabazite (CHA) zeolites for the selective catalytic reduction of NOx (x=1, 2) with NH$_3$ in automotive emission control. Thus, synthetic methods to control the proximity of framework Al atoms can open new opportunities to tailor the structure, stability and catalytic behavior of a given zeolite, especially at fixed elemental composition.

Based on the above detailed description, a method of synthesizing chabazite zeolites with controlled aluminum distribution can be described. The method begins by adding a source of an organic structure-directing agent and a source of an inorganic structure-directing agent to water to form an aqueous solution and homogenizing the aqueous solution for a first time period. The first time period can be in the range of 1 second to 48 hours. In a preferred embodiment, the source of the organic structure-directing agent can be an aqueous solution of N,N,N-trimethyl-1-adamantylammonium hydroxide and the source of the inorganic structure-directing agent can be sodium hydroxide. In one embodiment, the amounts of N,N,N-trimethyl-1-adamantylammonium hydroxide and sodium hydroxide are such that the molar ratio of sodium cations to N,N,N-trimethyl-1-adamantylammonium cations can be in a molar ratio in the range of 0.01 to 4.00.

Next, a source of aluminum is added to the homogenized aqueous solution to form an intermediate agent and homogenizing the intermediate agent for a second time period to form an aluminum-containing intermediate agent. The second time period can be in the range of 1 second to 48 hours. There are several sources that can be used advantageously as a source of aluminum. These include, but not limited to sodium aluminate aluminum hydroxide, aluminum nitrate, aluminosilicate, aluminum chloride, aluminum phosphate and aluminum isopropoxide.

Next, a source of silicon is added to the aluminum-containing intermediate agent to form an aluminosilicate-containing intermediate agent. The source of silicon can be one of colloidal silica, a silicon alkoxide compound, fumed silica, amorphous silica, and aluminosilicate.

The aluminosilicate-containing intermediate agent formed is then homogenized for a third time period to form a synthesis gel. The third time period can be in the range of 1 second to 48 hours. The synthesis gel is then subjected to a crystallization process to crystallize a chabazite zeolite.

Figure 6:
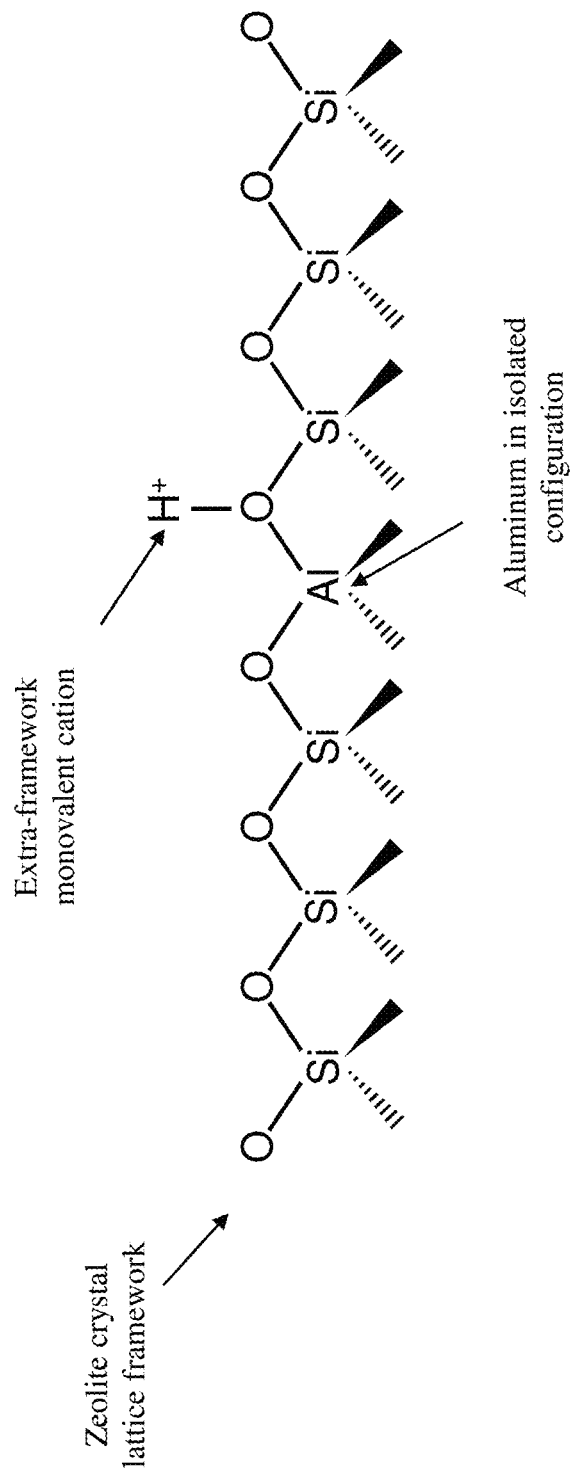
FIG. 6 is an illustration of a zeolite structure showing all the framework aluminum atoms in an isolated configuration.

It is another objective of this disclosure to describe a chabazite zeolite structure with controlled aluminum distribution. In such a chabazite zeolite structure, each aluminum atom in crystal lattice framework positions of the zeolite framework is in an isolated configuration, such that the zeolite cannot bind with a divalent cation in an extra-framework position. Such a structure is illustrated in FIG. 6. Referring to FIG. 6, Al atoms are in isolated configuration and can only bind with a monovalent cation, such as, but not limited to, $H^+$. For purposes of this disclosure, a lattice framework position is a crystallographic position for an atom (e.g., silicon, aluminum) that is tetrahedrally-bonded to four atoms in the crystalline zeolite lattice.

Depending on the amount of inorganic structure-directing agent added during crystallization of zeolite as described in this disclosure, non-aluminum inorganic cations can be present in extra-framework positions of the zeolite. For purposes of this disclosure, an extra-framework position is to be understood to mean a position that is not covalently bonded to four atoms in the crystalline zeolite lattice. Atoms, ions and complexes located in extra-framework positions of a zeolite typically refer to those found in the pore spaces of the solid, and not those incorporated into the lattice framework itself.

Figure 7:
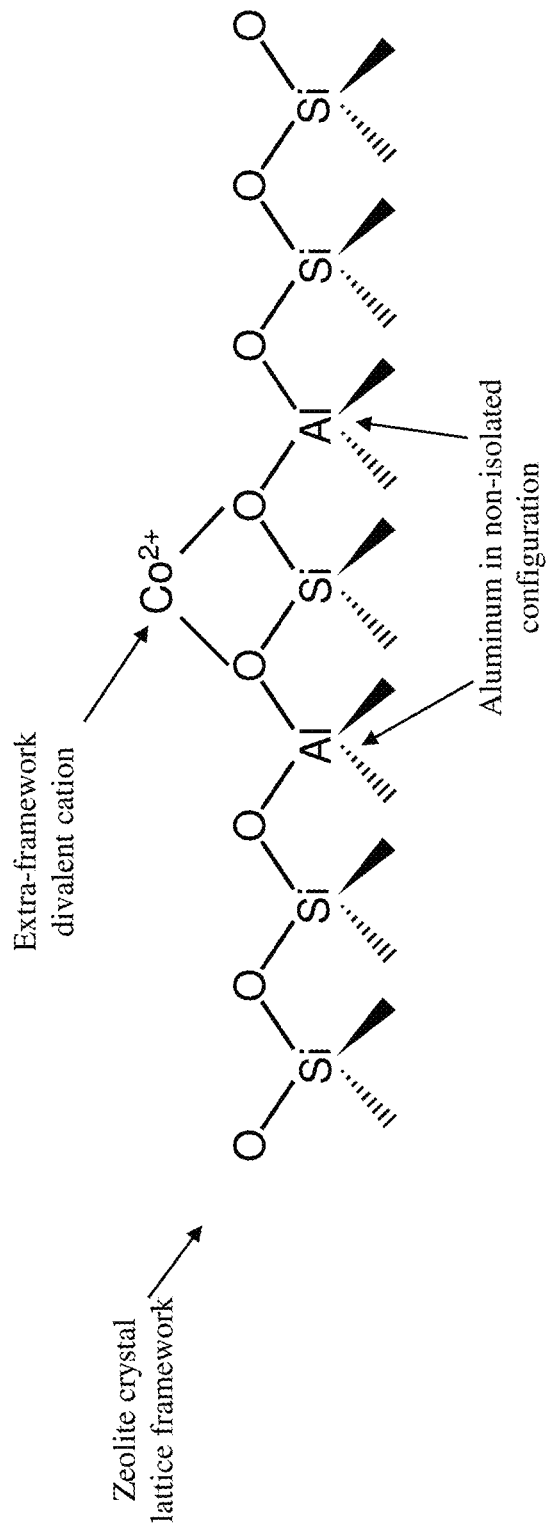
FIG. 7 is an illustration of a zeolite structure wherein only a fraction of the framework aluminum atoms are an isolated configuration.

These non-aluminum inorganic cations can include, but not limited to sodium cations, calcium cations, potassium cations, magnesium cations, cobalt cations, copper cations, and lithium cations, and combinations thereof. In such a scenario, only a fraction of the aluminum atoms in the crystal lattice framework positions of the zeolite are in an isolated configuration and this fraction cannot exchange a divalent cation in an extra-framework position. Thus, it is yet another objective of this disclosure to describe a different class of chabazite zeolite structures with controlled aluminum distribution, wherein by virtue of non-aluminum inorganic cations being present in extra-framework positions of the zeolite, only a fraction of the aluminum atoms in the crystal lattice framework positions of the zeolite framework are in an isolated configuration and this fraction cannot bind with a divalent cation in an extra-framework position. Such a structure is illustrated in FIG. 7. Referring to FIG. 7, a fraction of the aluminum atoms in the zeolite structure are not in isolated configuration and can bind with a divalent cation, such as, but not limited to, $Co^{2+}$. The fraction of such aluminum atoms in the zeolite lattice framework in an isolated configuration is in the range 0.0-1.0. In some embodiments, the range of this fraction can be 0.5-1.0.

It should be noted that it is possible in some embodiments that the cations in the extra-framework positions can include aluminum cations.

It should be noted that the method described here demonstrates synthetic procedures that directly and systematically control the Al distribution in chabazite zeolites at a fixed Si/Al ratio, by only manipulating the type and amount of structure-directing agents used.

While the present disclosure has been described with reference to certain embodiments, it will be apparent to those of ordinary skill in the art that other embodiments and implementations are possible that are within the scope of the present disclosure without departing from the spirit and scope of the present disclosure. Thus, the implementations should not be limited to the particular limitations described. Other implementations may be possible. It is therefore intended that the foregoing detailed description be regarded as illustrative rather than limiting. Thus, this disclosure is limited only by the following claims.

The invention claimed is:

1. A method of synthesizing chabazite zeolites with controlled aluminum distribution, the method comprising:
   determining a relationship between ratio of saturation $Co^{2+}/Al$ obtained from an ion exchange isotherm of a crystallized chabazite zeolite, and ratio ($Na^+/Al$) of number of sodium ions to number of aluminum atoms in the crystallized chabazite zeolite obtained from elemental analysis of the crystallized chabazite zeolite;
   providing a desired value for ratio ($Na^+/Al$) of number of sodium ions to number of aluminum atoms in a crystallized chabazite zeolite;
   adding a source of N,N,N-trimethyl-1-admantylammonium ions ($TMAda^+$) and to water to form an aqueous solution and homogenizing the aqueous solution for a first time period;
   adding sodium aluminate to the homogenized aqueous solution to form an intermediate agent and homogenizing the intermediate agent for a second time period to form an aluminum-containing intermediate agent;
   adding a source of silicon to the aluminum-containing intermediate agent to form an aluminosilicate-containing intermediate agent and homogenizing the aluminosilicate-containing intermediate agent for a third time period to form a synthesis gel;
   wherein a correlation of $Na^+/TMAda^+$ to the saturation $Co^{2+}/Al$ and the relationship between ratio of saturation $Co^{2+}/Al$ obtained from an ion exchange isotherm of a crystallized chabazite zeolite, and ratio ($Na^+/Al$) of number of sodium ions to number of aluminum atoms in the crystallized chabazite zeolite obtained from elemental analysis of the crystallized chabazite zeolite is utilized to determine the molar ion ratio $Na^+/TMAda^+$ in the synthesis gel; and
   subjecting the synthesis gel to a crystallization process to crystallize a chabazite zeolite, wherein the determined molar ion ratio $Na^+/TMAda^+$ results in the desired value for ratio ($Na^+/Al$) of number of sodium ions to number of aluminum atoms in a crystallized chabazite zeolite.

2. The method of claim 1, wherein the amounts of N,N,N-trimethyl-1-adamantylammonium hydroxide and sodium hydroxide are such that the molar ratio of sodium cations to N,N,N-trimethyl-1-adamantylammonium cations are in a molar ratio in the range of 0.01 to 4.00.

3. The method of claim 2 wherein the source of silicon is one of colloidal silica, a silicon alkoxide compound, fumed silica, amorphous silica, and aluminosilicate.

4. The method of claim 1, wherein the source of silicon is sodium silicate such that the molar ratio of sodium cations to N,N,N-trimethyl-1-adamantylammonium cations is in the range of 0.01 to 4.00.

5. The method of claim 1, where in the first time period, the second time period and the third time period are each in the range of 1 second to 48 hours.

6. A method of synthesizing chabazite zeolites with controlled aluminum distribution, the method comprising:
   adding a source of N,N,N-trimethyl-1-admantylammonium ions ($TMAda^+$) and a source of sodium ions ($Na^+$) to water to form an aqueous solution and homogenizing the aqueous solution for a first time period;

adding sodium aluminate to the homogenized aqueous solution to form an intermediate agent and homogenizing the intermediate agent for a second time period to form an aluminum-containing intermediate agent;

adding a source of silicon to the aluminum-containing intermediate agent to form an aluminosilicate-containing intermediate agent and homogenizing the aluminosilicate-containing intermediate agent for a third time period to form a synthesis gel; and subjecting the synthesis gel to a crystallization process to crystallize a chabazite zeolite, wherein the determined molar ion ratio $Na^+/TMAda^+$ results in the desired value for ratio ($Na^+/Al$) of number of sodium ions to number of aluminum atoms in a crystallized chabazite zeolite.

7. The method of claim 6, wherein the source of the N,N,N-trimethyl-1-admantylammonium ions is an aqueous solution of N,N,N-trimethyl-1-adamantylammonium hydroxide and the source of the sodium ions is sodium hydroxide.

8. The method of claim 7, wherein the amounts of N,N,N-trimethyl-1-adamantylammonium hydroxide and sodium hydroxide are such that the molar ratio of sodium cations to N,N,N-trimethyl-1-adamantylammonium cations are in a molar ratio in the range of 0.01 to 4.00.

9. The method of claim 6, wherein the source of silicon is one of colloidal silica, a silicon alkoxide compound, fumed silica, amorphous silica, and aluminosilicate.

10. The method of claim 6, where in the source of silicon is one of colloidal silica, a silicon alkoxide compound, fumed silica, amorphous silica, and aluminosilicate.

11. The method of claim 6, where in the first time period, the second time period and the third time period are each in the range of 1 second to 48 hours.

* * * * *